United States Patent
Watanabe et al.

(10) Patent No.: US 10,534,363 B2
(45) Date of Patent: Jan. 14, 2020

(54) AUTONOMOUS DRIVING DEVICE AND AUTONOMOUS DRIVING METHOD

(71) Applicant: TOYOTA JIDOSHA KABUSHIKI KAISHA, Toyota-shi, Aichi-ken (JP)

(72) Inventors: Junya Watanabe, Shizuoka-ken (JP); Hideyuki Matsui, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 63 days.

(21) Appl. No.: 15/888,225

(22) Filed: Feb. 5, 2018

(65) Prior Publication Data
US 2018/0224858 A1  Aug. 9, 2018

(30) Foreign Application Priority Data
Feb. 7, 2017  (JP) .................. 2017-020644

(51) Int. Cl.
| | |
|---|---|
| G05D 1/02 | (2006.01) |
| G09B 19/00 | (2006.01) |
| G09B 19/14 | (2006.01) |
| G05D 1/00 | (2006.01) |

(52) U.S. Cl.
CPC ......... G05D 1/0212 (2013.01); G05D 1/0088 (2013.01); G09B 19/00 (2013.01); *G05D 2201/0212* (2013.01)

(58) Field of Classification Search
CPC .............. G05D 1/0212; G05D 1/0088; G05D 2201/0212; G09B 19/14; G09B 19/16; G09B 19/00

USPC ........................................................ 701/25
See application file for complete search history.

(56) References Cited

U.S. PATENT DOCUMENTS

| | | | |
|---|---|---|---|
| 6,208,934 B1 | 3/2001 | Bechtolsheim et al. | |
| 2016/0343266 A1 | 11/2016 | Sayer | |
| 2017/0213164 A1* | 7/2017 | Rainbolt ................ | G06Q 10/02 |
| 2018/0096605 A1* | 4/2018 | Bai ........................ | G08G 1/166 |

FOREIGN PATENT DOCUMENTS

| | | | |
|---|---|---|---|
| JP | 2000-213946 A | | 8/2000 |
| JP | 2006119889 A | * | 5/2006 |
| JP | 2015-175825 A | | 10/2015 |
| JP | 2016-085509 A | | 5/2016 |

* cited by examiner

*Primary Examiner* — Marthe Y Marc-Coleman
(74) *Attorney, Agent, or Firm* — Sughrue Mion, PLLC (57) ABSTRACT

An autonomous driving device includes a route acquisition unit, a vehicle position determination unit, a stop section estimation unit, an intention confirmation unit, a reward provision unit configured to provide reward for getting off the vehicle in a case where the intention confirmation unit confirms that the occupant has the intention to get off the vehicle, and a traveling controller configured to perform an autonomous driving control and to stop a vehicle before the vehicle arrives at an autonomous driving stop section in a case where the intention confirmation unit confirms that an occupant has the intention to get off the vehicle while the autonomous driving control is being performed.

10 Claims, 3 Drawing Sheets

FIG. 3

AUTONOMOUS DRIVING DEVICE AND AUTONOMOUS DRIVING METHOD

INCORPORATION BY REFERENCE

The disclosure of Japanese Patent Application No. 2017-020644 filed on Feb. 7, 2017 including the specification, drawings and abstract is incorporated herein by reference in its entirety.

BACKGROUND

1. Technical Field

The present disclosure relates to an autonomous driving device and an autonomous driving method.

2. Description of Related Art

For example, Japanese Unexamined Patent Application Publication No. 2015-175825 (JP 2015-175825 A) describes an autonomous driving device that performs autonomous driving control that makes a vehicle travel autonomously. The autonomous driving device searches for a route for avoiding an autonomous driving stop section having a possibility that the autonomous driving control is stopped and makes the vehicle travel autonomously to a destination.

SUMMARY

For example, in the autonomous driving device described in JP 2015-175825 A, in a case where an autonomous driving stop section is present near a destination, the autonomous driving device may not be able to search for another route in which the autonomous driving control can be performed. In this case, the driving state of a vehicle may be switched from an autonomous driving state to a manual driving state when the vehicle arrives at the autonomous driving stop section and an occupant of the vehicle may feel inconvenience due to the switching of the driving state. In the present technical field, it is desired to further reduce the inconvenience that is felt by the occupant when the driving state of the vehicle is switched from the autonomous driving state to the manual driving state.

A first aspect of the disclosure relates to an autonomous driving device for performing autonomous driving control that makes a vehicle travel autonomously. The autonomous driving device includes a route acquisition unit, a vehicle position determination unit, a stop section estimation unit, an intention confirmation unit, a reward provision unit, and a traveling controller. The route acquisition unit is configured to acquire a route for a time when the vehicle travels to a destination set in advance under the autonomous driving control. The vehicle position determination unit is configured to determine whether the position of the vehicle is within an area around the destination including the destination. The stop section estimation unit is configured to estimate whether an autonomous driving stop section having a possibility that the autonomous driving control is stopped is present on a route from the position of the vehicle to the destination and to estimate the position of the autonomous driving stop section in a case where the position of the vehicle is within the area around the destination. The intention confirmation unit is configured to confirm whether an occupant of the vehicle has an intention to get off the vehicle in a case where the vehicle position determination unit determines that the position of the vehicle is within the area around the destination and the stop section estimation unit estimates that the autonomous driving stop section is present between the current position of the vehicle and the destination. The reward provision unit is configured to provide reward for getting off the vehicle in a case where the intention confirmation unit confirms that the occupant has the intention to get off the vehicle. The traveling controller is configured to perform the autonomous driving control and to stop the vehicle before the vehicle arrives at the autonomous driving stop section in a case where the intention confirmation unit confirms that the occupant has the intention to get off the vehicle while the autonomous driving control is being performed.

In the autonomous driving device according to the first aspect of the disclosure, in a case where the autonomous driving stop section is present between the current position of the vehicle and the destination, the intention confirmation unit confirms whether the occupant of the vehicle has the intention to get off the vehicle. In a case where the occupant has the intention to get off the vehicle, the autonomous driving device stops the vehicle before the vehicle arrives at the autonomous driving stop section. Therefore, in a case where the autonomous driving stop section is present and the occupant has the intention to get off the vehicle, the driving state of the vehicle is not switched from an autonomous driving state to a manual driving state. Accordingly, with the autonomous driving device, it is possible to further reduce inconvenience that is felt by the occupant when the driving state of the vehicle is switched from the autonomous driving state to the manual driving state. The autonomous driving device provides the reward for getting off the vehicle in a case where the occupant has the intention to get off the vehicle. Therefore, with the autonomous driving device, it is possible to motivate the occupant to get off the vehicle by providing the reward.

In the autonomous driving device according to the first aspect of the disclosure, the area around the destination may be an area in which a time taken for the vehicle traveling under the autonomous driving control to arrive at the destination becomes equal to or shorter than a predetermined time. For example, there is a case where it takes a relatively long time to arrive at a destination since it is not possible to arrive at the destination without taking a detour even though the linear distance to the destination is short. Even in such a case, since the area around the destination is set based on a time taken to arrive at the destination, the autonomous driving device can determine whether the position of the vehicle is within the area around the destination based on the area around the destination that is appropriately set.

The autonomous driving device according to the first aspect of the disclosure may further include a traffic information acquisition unit configured to acquire traffic information on the route to the destination that is acquired by the route acquisition unit. The stop section estimation unit may estimate whether the autonomous driving stop section is present based on the acquired traffic information and may estimate the position of the autonomous driving stop section based on the acquired traffic information. In this case, the autonomous driving device can appropriately estimate whether the autonomous driving stop section is present and the position of the autonomous driving stop section based on the acquired traffic information.

The autonomous driving device according to the first aspect of the disclosure may further include an operation unit configured to be operated by the occupant. The intention confirmation unit may give notification for confirming the intention to get off the vehicle and confirm whether the occupant has the intention to get off the vehicle based on an operation on the operation unit that is performed by the occupant. In this case, the occupant of the vehicle can input an operation indicating the intention to get off the vehicle to the autonomous driving device through the operation unit.

The autonomous driving device according to the first aspect of the disclosure may further include a terminal position acquisition unit configured to acquire positional information of a portable terminal that is carried by the occupant. The reward provision unit may determine whether the occupant is staying at the destination for a predetermined time or more after getting off the vehicle based on the acquired positional information of the portable terminal and may provide the reward when the occupant stays at the destination for the predetermined time or more in a case where the reward provision unit provides the reward for getting off the vehicle. In this case, the autonomous driving device can appropriately provide the reward based on whether the occupant is staying at the destination after getting off the vehicle.

A second aspect of the disclosure relates to an autonomous driving method for performing autonomous driving control that makes a vehicle travel autonomously. The autonomous driving method includes acquiring a route for a time when the vehicle travels to a destination set in advance under the autonomous driving control, determining whether the position of the vehicle is within an area around the destination including the destination, estimating whether an autonomous driving stop section having a possibility that the autonomous driving control is stopped is present on a route from the position of the vehicle to the destination and estimating the position of the autonomous driving stop section in a case where the position of the vehicle is within the area around the destination, confirming whether an occupant of the vehicle has an intention to get off the vehicle in a case where determination is made that the position of the vehicle is within the area around the destination and estimation is made that the autonomous driving stop section is present between the current position of the vehicle and the destination, providing reward for getting off the vehicle in a case where confirmation is made that the occupant has the intention to get off the vehicle, and stopping the vehicle before the vehicle arrives at the autonomous driving stop section in a case where confirmation is made that the occupant has the intention to get off the vehicle while the autonomous driving control is being performed.

In the autonomous driving method according to the second aspect of the disclosure, in a case where the autonomous driving stop section is present between the current position of the vehicle and the destination, whether the occupant of the vehicle has the intention to get off the vehicle is confirmed. In a case where the occupant has the intention to get off the vehicle, in the autonomous driving method, the vehicle is stopped before the vehicle arrives at the autonomous driving stop section. Therefore, in a case where the autonomous driving stop section is present and the occupant has the intention to get off the vehicle, the driving state of the vehicle is not switched from an autonomous driving state to a manual driving state. Accordingly, with the autonomous driving method, it is possible to further reduce inconvenience that is felt by the occupant when the driving state of the vehicle is switched from the autonomous driving state to the manual driving state. In the autonomous driving method, the reward for getting off the vehicle is provided in a case where the occupant has the intention to get off the vehicle. Therefore, with the autonomous driving method, it is possible to motivate the occupant to get off the vehicle by providing the reward.

In the autonomous driving method according to the second aspect of the disclosure, the area around the destination may be an area in which a time taken for the vehicle traveling under the autonomous driving control to arrive at the destination becomes equal to or shorter than a predetermined time. For example, there is a case where it takes a relatively long time to arrive at a destination since it is not possible to arrive at the destination without taking a detour even though the linear distance to the destination is short. Even in such a case, since the area around the destination is set based on a time taken to arrive at the destination, with the autonomous driving method, it is possible to determine whether the position of the vehicle is within the area around the destination based on the area around the destination that is appropriately set.

The autonomous driving method according to the second aspect of the disclosure may further include acquiring traffic information on the route to the destination that is acquired in the acquiring of the route. Whether the autonomous driving stop section is present is estimated based on the acquired traffic information and the position of the autonomous driving stop section may be estimated based on the acquired traffic information. In this case, with the autonomous driving method it is possible to appropriately estimate whether the autonomous driving stop section is present and the position of the autonomous driving stop section based on the acquired traffic information.

In the autonomous driving method according to the second aspect of the disclosure, the vehicle may include an operation unit configured to be operated by the occupant. Notification for confirming the intention to get off the vehicle may be performed and whether the occupant has the intention to get off the vehicle may be confirmed based on an operation on the operation unit that is performed by the occupant. In this case, the occupant of the vehicle can input an operation indicating the intention to get off the vehicle to the autonomous driving device through the operation unit.

The autonomous driving method according to the second aspect of the disclosure may further include acquiring positional information of a portable terminal that is carried by the occupant. Whether the occupant is staying at the destination for a predetermined time or more after getting off the vehicle may be determined based on the acquired positional information of the portable terminal and the reward may be provided when the occupant stays at the destination for the predetermined time or more in a case where the reward for getting off the vehicle is provided. In this case, with the autonomous driving method, it is possible to appropriately provide the reward based on whether the occupant is staying at the destination after getting off the vehicle.

According to the aspects of the disclosure, it is possible to reduce inconvenience that is felt by an occupant when the driving state of the vehicle is switched from an autonomous driving state to a manual driving state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described referring to the drawings. In the description of the drawings, the same elements are represented by the same reference numerals, and overlapping description will not be repeated.

Figure 1:
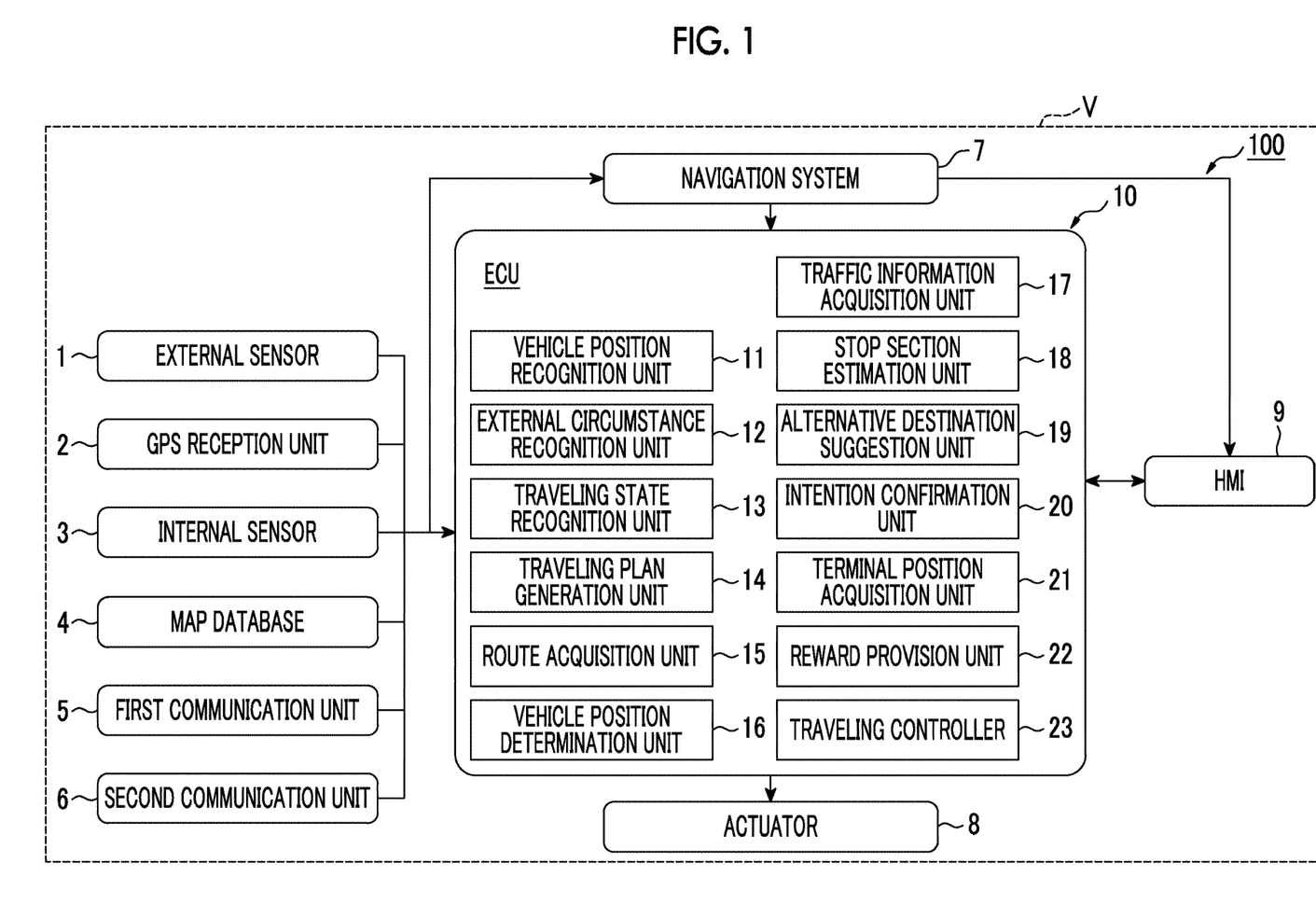
FIG. 1 is a diagram showing the schematic configuration of an autonomous driving device according to an embodiment.

As illustrated in FIG. 1, an autonomous driving device 100 in the embodiment is mounted in a vehicle V, such as a passenger vehicle, and performs autonomous driving control that makes the vehicle V travel autonomously based on a traveling plan generated in advance. An autonomous driving state in which the autonomous driving control is being performed is a state where the autonomous driving device 100 is performing control including speed control and steering control of the vehicle V.

As shown in FIG. 1, the autonomous driving device 100 includes an ECU 10 for performing the autonomous driving control. The ECU 10 is an electronic control unit having a central processing unit (CPU), a read only memory (ROM), a random access memory (RAM), a controller area network (CAN) communication circuit, and the like. In the ECU 10, a program that is stored in the ROM is loaded on the RAM, and the program loaded on the RAM is executed by the CPU, thereby realizing various functions. The ECU 10 may be constituted of a plurality of electronic control units. An external sensor 1, a GPS reception unit 2, an internal sensor 3, a map database 4, a first communication unit 5, a second communication unit 6, a navigation system 7, an actuator 8, and a human machine interface (HMI) 9 are connected to the ECU 10.

The external sensor 1 is a detection device that detects circumstances around the vehicle V. The external sensor 1 includes at least one of a camera and a radar sensor. The camera is an imaging device that images external circumstances of the vehicle V. The camera is provided on a rear side of a windshield of the vehicle V. The camera transmits imaging information relating to the external circumstances of the vehicle V to the ECU 10. The camera may be a monocular camera or a stereo camera. The stereo camera has two imaging units disposed so as to reproduce binocular parallax. Imaging information of the stereo camera includes information in a depth direction.

The radar sensor is a detection device that detects obstacles around the vehicle V using electric waves (for example, millimeter waves) or light. The radar sensor includes a millimeter wave radar or a light detection and ranging (LIDAR) device. The radar sensor transmits electric waves or light around the vehicle V and receives electric waves or light reflected from obstacles to detect obstacles. The radar sensor transmits detected obstacle information to the ECU 10. Examples of the obstacles include movable obstacles, such as pedestrians, bicycles, and other vehicles, in addition to fixed obstacles, such as guardrails and buildings.

The GPS reception unit 2 functions as a position measuring unit that is mounted in the vehicle V and that measures the position of the vehicle V. The GPS reception unit 2 measures the position (for example, latitude and longitude of vehicle V) of the vehicle V by receiving signals from three or more GPS satellites. The GPS reception unit 2 transmits the measured positional information of the vehicle V to the ECU 10.

The internal sensor 3 is a detection device that detects the traveling state of the vehicle V. The internal sensor 3 includes at least one of a vehicle speed sensor, an acceleration sensor, and a yaw rate sensor. The vehicle speed sensor is a detector that detects the speed of the vehicle V. As the vehicle speed sensor, for example, a wheel speed sensor that is provided in a wheel of the vehicle V, a drive shaft configured to rotate integrally with the wheel, or the like, and detects the rotation speed of the wheel is used. The vehicle speed sensor transmits detected vehicle speed information to the ECU 10.

The acceleration sensor is a detector that detects the acceleration of the vehicle V. The acceleration sensor includes, for example, a front-rear acceleration sensor that detects the acceleration of the vehicle V in a front-rear direction, and a lateral acceleration sensor that detects the lateral acceleration of the vehicle V. The acceleration sensor transmits acceleration information of the vehicle V to the ECU 10. The yaw rate sensor is a detector that detects the yaw rate (rotational angular velocity) of the center of gravity of the vehicle V around a vertical axis. As the yaw rate sensor, for example, a gyro sensor can be used. The yaw rate sensor transmits detected yaw rate information of the vehicle V to the ECU 10.

The map database 4 is a database that stores map information. The map database 4 is formed in a hard disk drive (HDD) mounted in the vehicle V. The map information includes positional information on roads, information on road shapes, positional information on intersections and branch points, a road speed limit, and the like. The information on road shapes includes, for example, classifications of curves and straight portions, curvatures of curves, and inclination of a road surface (upward slope and downward slope). The map database 4 may be stored in a server that is communicable with the vehicle V.

The first communication unit 5 has a function of performing wireless communication with an external server that can distribute traffic information or the like. The traffic information includes information related to a factor that hinders traveling of the vehicle V that travels under the autonomous driving control and the like. In the embodiment, for example, the traffic information includes information such as a place where a traffic jam has occurred and the degree (degree of congestion) of the traffic jam.

The second communication unit 6 has a function of performing wireless communication with an external server that can distribute positional information of a portable terminal that is carried by an occupant of the vehicle V or the like. For example, in a case where a portable terminal is a cellular phone, the external server that can distribute the positional information of the portable terminal or the like may be a server owned by a cellular phone communication service provider. In this case, for example, the server owned by the cellular phone communication service provider may monitor the position of the cellular phone. Alternatively, the second communication unit 6 may have a function of performing wireless communication with a portable terminal carried by the occupant of the vehicle V to directly acquire positional information of the portable terminal. In this case, for example, the portable terminal carried by the occupant may measure the position of the portable terminal by using a GPS reception unit mounted in the portable terminal and distribute the positional information to the second communication unit 6.

The navigation system 7 is mounted in the vehicle V and sets a target route on which the vehicle V travels autonomously. The navigation system 7 calculates the target route from the position of the vehicle V to a destination based on the destination set in advance, the position of the vehicle V that is measured by the GPS reception unit 2, and the map information of the map database 4. The destination set in advance is set when the occupant of the vehicle V operates an input button (or touch panel) provided in the navigation system 7. The target route is set in such a manner that lanes constituting a road are distinguished from each other. The navigation system 7 can set a target route by means of a known method. The navigation system 7 notifies a driver of the target route by means of displays displayed on a display and a voice output from a speaker. The navigation system 7 outputs information on the target route of the vehicle V to the ECU 10.

The actuator 8 is a device that performs traveling control of the vehicle V. The actuator 8 includes at least a throttle actuator, a brake actuator, and a steering actuator. The throttle actuator controls the amount of air (throttle valve opening degree) supplied to an engine according to a control signal from the ECU 10, and controls drive power of the vehicle V. In a case where the vehicle V is a hybrid vehicle, in addition to the amount of air supplied to the engine, a control signal from the ECU 10 is input to a motor as a power source and the drive power is controlled. In a case where the vehicle V is an electric vehicle, a control signal from the ECU 10 is input to a motor as a power source, and the drive power is controlled. In both cases, the motor as a power source constitutes the actuator 8.

The brake actuator controls a brake system according to a control signal from the ECU 10, and controls braking force that is given to the wheels of the vehicle V. As the brake system, for example, a hydraulic brake system can be used. The steering actuator controls the drive of an assist motor configured to control steering torque in an electric power steering system according to a control signal from the ECU 10. With this, the steering actuator controls the steering torque of the vehicle V.

The HMI 9 is an interface that is provided to perform input and output of information between the driver and the autonomous driving device 100. The HMI 9 includes a display that displays image information for the occupant of the vehicle V, a speaker that outputs a voice, and an operation unit such as an input button, a touch panel, or a voice input device that is operated by the occupant for an input operation. The HMI 9 transmits information input by the occupant to the ECU 10. The HMI 9 displays the image information on the display and outputs a voice via the speaker according to a control signal from the ECU 10.

Next, the functional configuration of the ECU 10 will be described. The ECU 10 has a vehicle position recognition unit 11, an external circumstance recognition unit 12, a traveling state recognition unit 13, a traveling plan generation unit 14, a route acquisition unit 15, a vehicle position determination unit 16, a traffic information acquisition unit 17, a stop section estimation unit 18, an alternative destination suggestion unit 19, an intention confirmation unit 20, a terminal position acquisition unit 21, a reward provision unit 22, and a traveling controller 23. A part of the functions of the ECU 10 may be executed in a server that is communicable with the vehicle V.

The vehicle position recognition unit 11 recognizes the position of the vehicle V on a map based on the positional information of the GPS reception unit 2 and the map information of the map database 4. The vehicle position recognition unit 11 may recognize the position of the vehicle V by using positional information of fixed obstacles, such as poles, included in the map information of the map database 4 and the detection result of the external sensor 1 with a known SLAM technique.

The external circumstance recognition unit 12 recognizes external circumstances around the vehicle V based on the detection result of the external sensor 1. The external circumstance recognition unit 12 recognizes the external circumstances around the vehicle V including the positions of obstacles around the vehicle V based on captured images of the camera and the obstacle information of the radar sensor by using a known method.

The traveling state recognition unit 13 recognizes the traveling state of the vehicle V including the vehicle speed and orientation of the vehicle V based on the detection result of the internal sensor 3. Specifically, the traveling state recognition unit 13 recognizes the vehicle speed of the vehicle V based on the vehicle speed information of the vehicle speed sensor. The traveling state recognition unit 13 recognizes the orientation of the vehicle V based on the yaw rate information of the yaw rate sensor.

The traveling plan generation unit 14 generates a traveling plan of the vehicle V based on the target route set by the navigation system 7, the map information of the map database 4, the external circumstances around the vehicle V recognized by the external circumstance recognition unit 12, and the traveling state of the vehicle V recognized by the traveling state recognition unit 13. The traveling plan is a traveling plan for traveling from a current position of the vehicle V to a destination set in advance.

The traveling plan includes a control target value of the vehicle V according to the position on the target route of the vehicle V. The position on the target route is the position on the map in an extension direction of the target route. The position on the target route means a set vertical position set at every predetermined interval (for example, 1 m) in the extension direction of the target route. The control target value is a value that becomes a control target of the vehicle V in the traveling plan. The control target value is set in association with each set vertical position on the target route. The traveling plan generation unit 14 sets the set vertical position at the predetermined interval on the target route and sets the control target value (for example, target horizontal position and target vehicle speed) for each set vertical position, thereby generating the traveling plan. The set vertical position and the target horizontal position may be combined and set as one position coordinates. The set vertical position and the target horizontal position mean information of a vertical position and information of a horizontal position that are set as a target in the traveling plan.

In a case where the intention confirmation unit 20 determines that the occupant has accepted a change of destination to an alternative destination, the traveling plan generation unit 14 generates a traveling plan for traveling to the alternative destination instead of the traveling plan for traveling to a destination set in advance. In this case, the navigation system 7 sets a target route from the position of the vehicle V to the alternative destination in a case where the intention confirmation unit 20 determines that the occupant has accepted the change of destination to the alternative destination. The traveling plan generation unit 14 generates a traveling plan for traveling to the alternative destination as described above based on the target route to the alternative destination that is set by the navigation system 7.

The route acquisition unit 15 acquires a route for a time when the vehicle V travels to the destination set in advance under the autonomous driving control. Specifically, the route acquisition unit 15 acquires a target route to a destination that is set by the navigation system 7 as a route for a time when the vehicle V travels to the destination set in advance under the autonomous driving control.

The vehicle position determination unit 16 specifies an area around the destination including the destination set in advance. The vehicle position determination unit 16 determines whether the position of the vehicle V is within the area around the destination based on the position of the vehicle V recognized by the vehicle position recognition unit 11. More specifically, the vehicle position determination unit 16 specifies an area in which a time taken for the vehicle V traveling along the target route acquired by the route acquisition unit 15 under the autonomous driving control to arrive at the destination becomes equal to or shorter than a predetermined time as the area around the destination. A time taken for the vehicle to arrive at the destination set in advance can be calculated by a known method in which a road speed limit or the like is considered. Note that, the area around the destination may not be specified based on a time taken for the vehicle to arrive at the destination and may be an area determined based on various criterions such as an area within a predetermined distance from the destination.

The traffic information acquisition unit 17 acquires traffic information on the target route acquired by the route acquisition unit 15. The traffic information acquisition unit 17 acquires the traffic information by using the first communication unit 5.

In a case where the vehicle position determination unit 16 determines that the position of the vehicle V is within the area around the destination, the stop section estimation unit 18 estimates whether an autonomous driving stop section having a possibility that the autonomous driving control is stopped is present on the target route from the position of the vehicle V to the destination and estimates the position of the autonomous driving stop section. Here, the area around the destination is an area specified by the vehicle position determination unit 16. The autonomous driving stop section means a section in which it is difficult to continue the autonomous driving control and the autonomous driving control may be stopped.

Specifically, the stop section estimation unit 18 estimates whether the autonomous driving stop section is present or not and estimates the position of the autonomous driving stop section based on the traffic information acquired by the traffic information acquisition unit 17. In a case where there is a traffic jam, an image of a long distance cannot be captured since an inter-vehicle distance between a preceding vehicle and the vehicle V is short and an imaging range of the camera is blocked by the preceding vehicle. In this case, the external circumstance recognition unit 12 may not be able to recognize circumstances other than circumstances pertaining to an area near the vehicle V even when the external circumstance recognition unit 12 tries to recognize the external circumstances by using the captured images of the camera or the like. Therefore, since the external circumstances are insufficiently recognized, the autonomous driving device 100 may determine that it is difficult to continue the autonomous driving control and may stop the autonomous driving control. In the embodiment, the stop section estimation unit 18 estimates a place where a traffic jam has occurred that is included in the traffic information as the autonomous driving stop section. The stop section estimation unit 18 may estimate a place where the degree of congestion included in the traffic information is equal to or greater than a predetermined value as the autonomous driving stop section.

In a case where there is a traffic jam near the destination set in advance, the alternative destination suggestion unit 19 suggests an alternative destination that is different from the destination set in advance. Specifically, in a case where the autonomous driving stop section is present on the target route to the destination within the area around the destination, the alternative destination suggestion unit 19 determines the alternative destination near the destination set in advance. The alternative destination means a destination at which the vehicle can arrive while not passing through the estimated autonomous driving stop section. For example, the alternative destination suggestion unit 19 may determine a point before the autonomous driving stop section on the target route to the destination set in advance as the alternative destination. The alternative destination suggestion unit 19 may determine a point offset from the target route to the destination set in advance as the alternative destination. The alternative destination suggestion unit 19 may determine a point within a predetermined distance from the destination set in advance as the alternative destination. The alternative destination suggestion unit 19 may determine a place where the vehicle V can be stopped as the alternative destination. The alternative destination suggestion unit 19 can determine the alternative destination by means of a known method based on the map information stored in the map database 4. The alternative destination suggestion unit 19 suggests the determined alternative destination to the occupant of the vehicle V by using a display, a voice, or the like through the HMI 9.

In a case where the vehicle position determination unit 16 determines that the position of the vehicle V is within the area around the destination and the stop section estimation unit 18 estimates that the autonomous driving stop section is present between the current position of the vehicle V and the destination, the intention confirmation unit 20 confirms whether the occupant of the vehicle V has an intention to get off the vehicle. Here, the intention is an intention of whether to get off the vehicle V before the vehicle V arrives at the autonomous driving stop section under the autonomous driving control. That is, the intention confirmation unit 20 confirms an intention of whether to get off the vehicle at a place other than the destination set in advance.

In order to confirm whether the occupant has the intention to get off the vehicle, first, the intention confirmation unit 20 gives notification for confirming the intention to get off the vehicle by using a display, a voice, or the like through the HMI 9. After the notification is issued, the intention confirmation unit 20 confirms whether the occupant has the intention to get off the vehicle based on an operation on the input button or the like of the HMI 9 that is performed by the occupant. For example, in a case where the occupant operates the input button or the like of the HMI 9, the intention confirmation unit 20 can determine that the occupant has the intention to get off the vehicle.

In a case where the alternative destination suggestion unit 19 suggests the alternative destination, the intention confirmation unit 20 confirms whether the occupant of the vehicle V has accepted a change of destination to the alternative destination from the destination set in advance. Specifically, the intention confirmation unit 20 confirms whether the occupant has accepted a change of destination to the alternative destination from the destination set in advance based on an operation on the input button or the like of the HMI 9 that is performed by the occupant. For example, in a case where the input button or the like of the HMI 9 is operated by the occupant, the intention confirmation unit 20 can determine that the occupant has accepted a change of destination to the alternative destination. That is, the intention confirmation unit 20 confirms an intention of whether to get off the vehicle at a place other than the destination set in advance.

The terminal position acquisition unit 21 acquires the positional information of the portable terminal carried by the occupant of the vehicle V. The terminal position acquisition unit 21 acquires the positional information of the portable terminal by using the second communication unit 6.

In a case where the intention confirmation unit 20 determines that the occupant has the intention to get off the vehicle, the reward provision unit 22 provides reward for getting off the vehicle. At a time when the reward provision unit 22 provides the reward for getting off the vehicle, the reward provision unit 22 determines whether the occupant is staying at the destination set in advance for a predetermined time or more based on the positional information of the portable terminal acquired by the terminal position acquisition unit 21. The reward provision unit 22 may provide the reward in a case where the occupant stays at the destination set in advance for the predetermined time or more.

Here, the reward for getting off the vehicle is a reward or the like that makes a profit for the occupant when the occupant receives the reward. For example, the reward for getting off the vehicle may be points. The points may be redeemable for a product, a service, or the like. The reward provision unit 22 may accumulate points each time the reward provision unit 22 provides points and may store and manage the accumulated points. The points provided by the reward provision unit 22 may be stored in and managed by a server or the like other than the reward provision unit 22 that is present outside the vehicle V. As a point management method, various known methods can be adopted.

The autonomous driving device 100 may be provided with an occupant detection unit that detects whether the occupant is present in the vehicle V. When the reward provision unit 22 provides reward for getting off the vehicle, the reward provision unit 22 may provide the reward in a case where the occupant detection unit detects that the occupant of the vehicle V has got off the vehicle. For example, the occupant detection unit can detect the presence or absence of the occupant by using a known technology in which the captured images of the camera that images the inside of the vehicle V are used, a known technology in which the detection result of a seating sensor that is provided in a seat on which the occupant sits, or the like.

In a case where the occupant inputs an autonomous driving control start operation, the traveling controller 23 performs the autonomous driving control. The traveling controller 23 may perform the autonomous driving control in a case where a predetermined condition is satisfied. The traveling controller 23 performs the autonomous driving control including speed control and steering control of the vehicle V based on the position of the vehicle V on the map recognized by the vehicle position recognition unit 11 and the traveling plan generated by the traveling plan generation unit 14. Here, the traveling plan is a traveling plan for traveling to the destination set in advance that is generated by the traveling plan generation unit 14 or a traveling plan for traveling to the alternative destination that is generated by the traveling plan generation unit 14. The traveling controller 23 performs the autonomous driving control by transmitting a control signal to the actuator 8. When the traveling controller 23 performs the autonomous driving control, the driving state of the vehicle V becomes the autonomous driving state.

In a case where the intention confirmation unit 20 determines that the occupant has the intention to get off the vehicle while the autonomous driving control is being performed based on the traveling plan for traveling to the destination set in advance, the traveling controller 23 stops the vehicle V before the vehicle arrives at the autonomous driving stop section. In a case where the intention confirmation unit 20 determines that the occupant has accepted the alternative destination while the autonomous driving control is being performed based on the traveling plan for traveling to the destination set in advance, the traveling controller 23 makes the vehicle V travel autonomously to the alternative destination based on the traveling plan for traveling to the alternative destination instead of the traveling plan for traveling to the destination set in advance. In a case where the vehicle arrives at the alternative destination, the traveling controller 23 stops the vehicle V. When the traveling controller 23 stops the vehicle V, the traveling controller 23 stops the vehicle V after moving the vehicle V to a place where the vehicle V does not hinder traveling of other vehicles. Examples of the place where the vehicle V does not hinder traveling of other vehicles include a shoulder of a road and an evacuation space. The traveling controller 23 stops the vehicle V after moving the vehicle V to a place where the vehicle V does not hinder traveling of other vehicles based on a known technique. The traveling controller 23 terminates the autonomous driving control after stopping the vehicle V.

Next, the flow of a process of providing reward for getting off the vehicle (autonomous driving method performed in autonomous driving device 100) will be described. Here, a case where the alternative destination suggestion unit 19 does not suggest the alternative destination and a case where the alternative destination is suggested will be described separately.

Case where Alternative Destination is not Suggested

Figure 2:
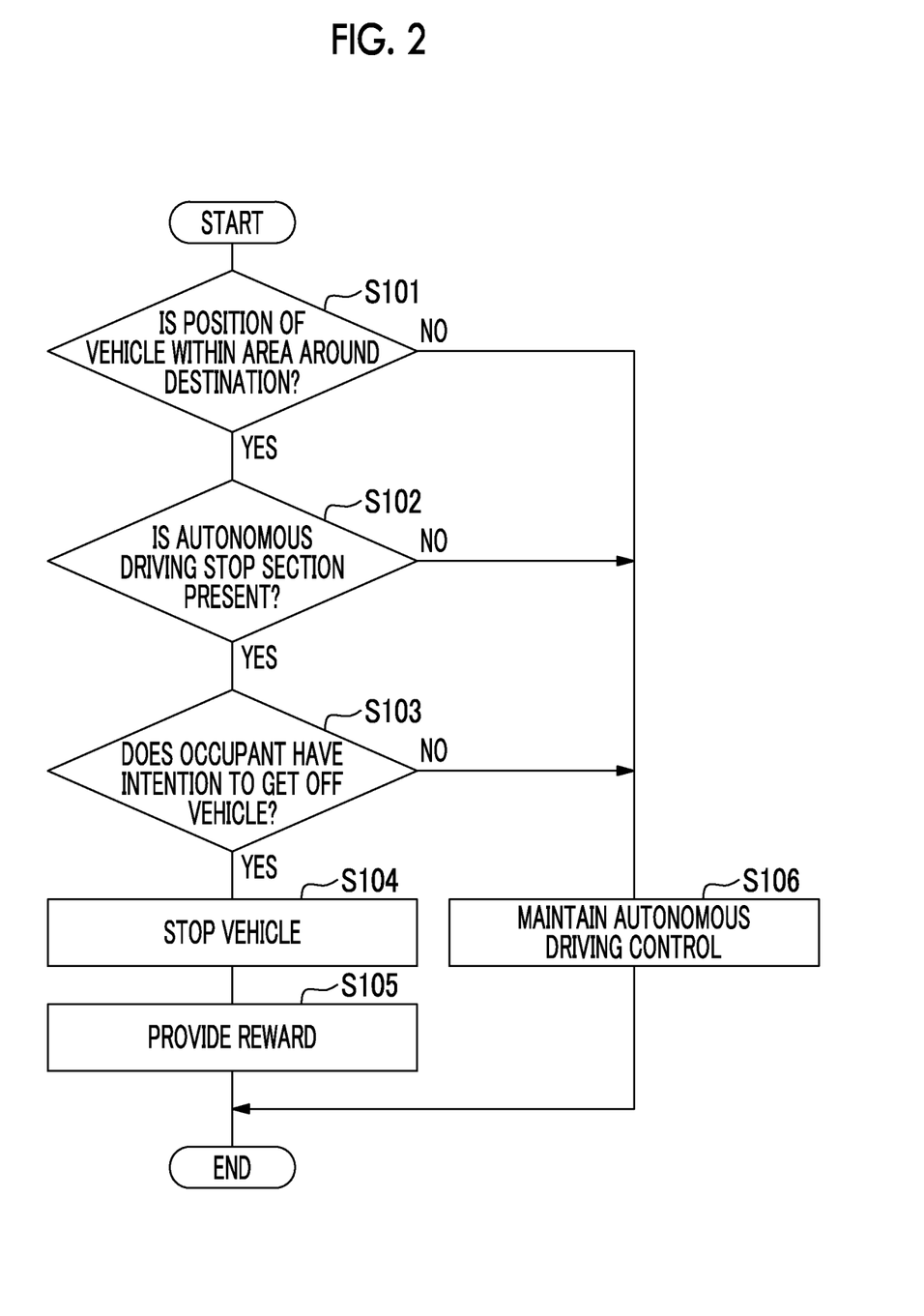
FIG. 2 is a flowchart showing the flow of a process of providing reward for getting off a vehicle pertaining to a case where an alternative destination is not suggested.

First, a process of providing the reward pertaining to a case where the alternative destination is not suggested will be described by using a flowchart in FIG. 2. The process in the flowchart in FIG. 2 is started when the autonomous driving control is started. The process in the flowchart in FIG. 2 is repeatedly performed for each predetermined period of time while the autonomous driving control is being performed. More specifically, in a case where the process reaches the end after a process of determining to maintain the autonomous driving control in S106, the process is started from the start after a predetermined time elapses. However, in a case where the process reaches the end after the autonomous driving control is stopped with a process of stopping the vehicle (S104) being performed, the process is started from the start when the autonomous driving control is started again.

As illustrated in FIG. 2, when the autonomous driving control is started, the vehicle position determination unit 16 determines whether the position of the vehicle V is within the area around the destination (S101: route acquisition step and vehicle position determination step). In a case where the position of the vehicle V is not within the area around the destination (S101: NO), the autonomous driving device 100 determines to maintain the autonomous driving control performed by the traveling controller 23 (S106). Therefore, the autonomous driving control performed by the traveling controller 23 is maintained.

In a case where the position of the vehicle V is within the area around the destination (S101: YES), the stop section estimation unit 18 estimates whether the autonomous driving stop section is present on the target route from the position of the vehicle V to the destination and estimates the position of the autonomous driving stop section (S102: traffic information acquisition step and stop section estimation step). In a case where the stop section estimation unit 18 estimates that the autonomous driving stop section is not present (S102: NO), the autonomous driving device 100 determines to maintain the autonomous driving control performed by the traveling controller 23 (S106). Therefore, the autonomous driving control performed by the traveling controller 23 is maintained.

In a case where the stop section estimation unit 18 estimates that the autonomous driving stop section is present (S102: YES), the intention confirmation unit 20 confirms whether the occupant of the vehicle V has the intention to get off the vehicle (S103: intention confirmation step). In a case where the occupant has no intention to get off the vehicle (S103: NO), the autonomous driving device 100 determines to maintain the autonomous driving control performed by the traveling controller 23 (S106). Therefore, the autonomous driving control performed by the traveling controller 23 is maintained. Note that, the traveling controller 23 continues the autonomous driving control although the stop section estimation unit 18 has estimated that the autonomous driving stop section is present on the target route to the destination. In a case where the vehicle V arrives at the autonomous driving stop section and it becomes not possible to continue the autonomous driving control, the traveling controller 23 terminates the autonomous driving control. Therefore, the driving state of the vehicle V is switched from the autonomous driving state to the manual driving state. In a case where it is possible to continue the autonomous driving control although the vehicle V has arrived at the autonomous driving stop section, the traveling controller 23 continues the autonomous driving control.

In a case where the occupant has the intention to get off the vehicle (S103: YES), the traveling controller 23 stops the vehicle V before the vehicle arrives at the autonomous driving stop section and terminates the autonomous driving control (S104: traveling control step). Since the vehicle V is stopped, it becomes possible for the occupant to get off the vehicle. After the vehicle V is stopped, the reward provision unit 22 provides the reward for getting off the vehicle (S105: reward providing step).

When the reward is provided in S105, the terminal position acquisition unit 21 acquires the positional information of the portable terminal of the occupant (terminal position acquisition step). Then, the reward provision unit 22 may provide the reward in a case where the occupant getting off the vehicle stays at the destination set in advance for the predetermined time or more. The above described method is effective in properly providing the reward. For example, there may be a case where the occupant sets a destination farther than the original destination and gets off the vehicle before the vehicle arrives at the destination set to be farther than the original destination in order to receive the reward. Therefore, when the reward is provided based on whether the occupant is staying at the destination set in advance, the reward provision unit 22 can properly provide the reward.

As a precondition for starting the process in the flowchart in FIG. 2, there may be a condition that an autonomous driving proportion (proportion of travel under autonomous driving control) of the vehicle V in a traveling route so far is equal to or greater than a predetermined value. For example, in a case where the autonomous driving proportion is high since the occupant prefers autonomous driving and makes the vehicle V travel under the autonomous driving control, the occupant of vehicle V may feel displeasure due to a switch to manual driving. In such a case, when reward for getting off the vehicle is provided after the intention to get off the vehicle is confirmed, it is possible to further reduce the displeasure of the occupant, for example.

For example, the autonomous driving device 100 may be provided with an occupant state detection unit that detects the state of the occupant and may confirm the intention to get off the vehicle according to the state of the occupant. For example, when the intention confirmation unit 20 confirms the intention to get off the vehicle, the intention confirmation unit 20 may confirm the intention to get off the vehicle in a case where the occupant state detection unit detects that the occupant is sleepy. The occupant state detection unit may determine whether the occupant is sleepy by detecting twinkling of eyes of the occupant from the captured image captured by the camera, for example. The occupant state detection unit may detect the state of the occupant based on the heart rate of the occupant. The occupant state detection unit may detect various states other than sleepiness as the state of the occupant. Therefore, it is possible to prompt the occupant to get off the vehicle according to the state of the occupant.

After the occupant gets off the vehicle, the autonomous driving device 100 may make the vehicle V travel autonomously to a place set in advance. For example, in a case where the vehicle V in which the autonomous driving device 100 is mounted is a vehicle used by a plurality of persons (car sharing), the autonomous driving device 100 may make the vehicle V travel autonomously to a vehicle allocation center set in advance in a state of being unmanned.

The autonomous driving device 100 stops the vehicle V according to a position at which the occupant gets off the vehicle before the vehicle arrives at the autonomous driving stop section, that is, in front of a section in which there is a traffic jam. Therefore, the vehicle V does not travel in the section in which there is a traffic jam, and thus in a case where the vehicle V that performs autonomous driving is a taxi or a vehicle used by a plurality of persons, a larger number of persons can use the vehicle (it is possible to improve turnover).

Case where Alternative Destination is Suggested

Figure 3:
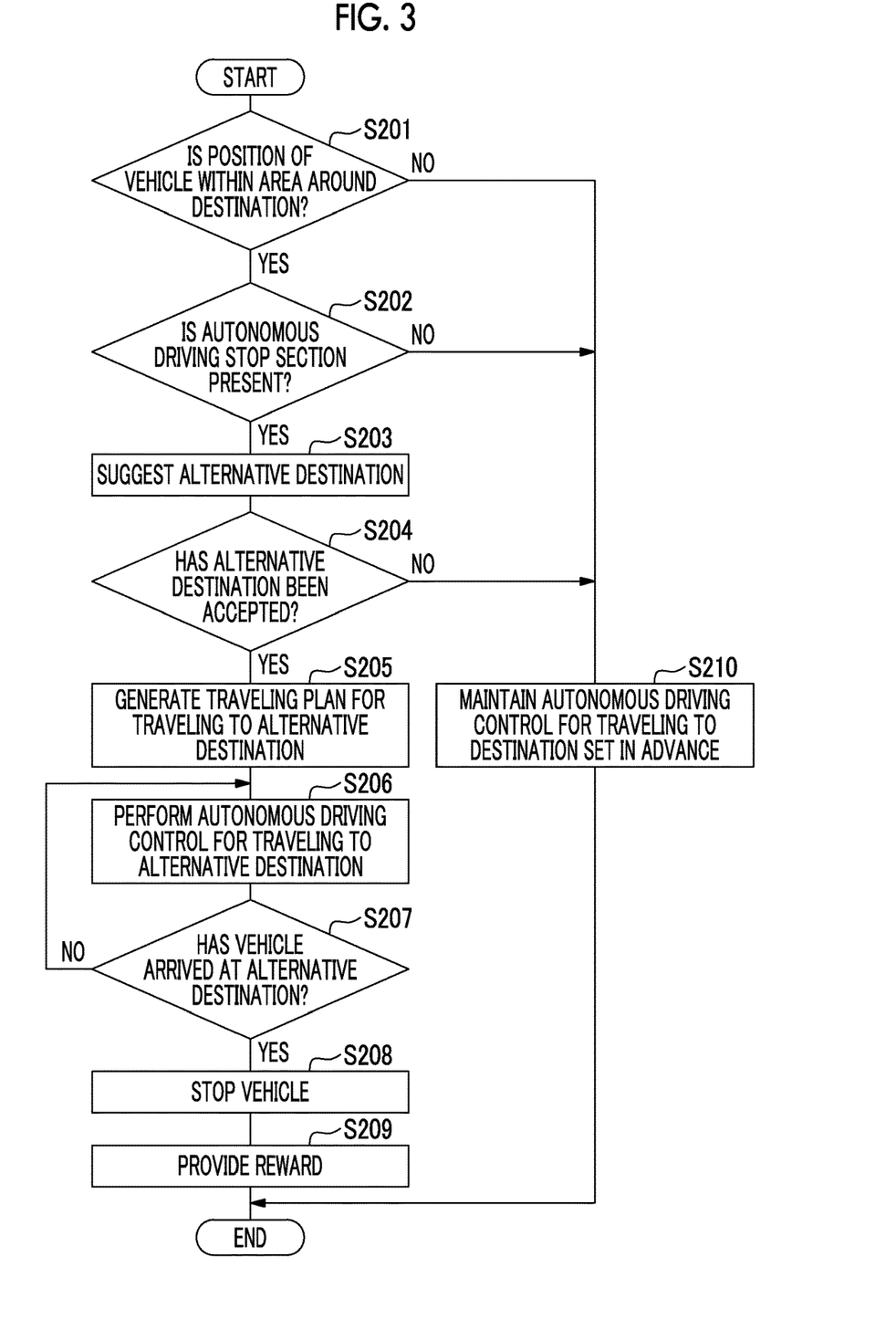
FIG. 3 is a flowchart showing the flow of the process of providing reward for getting off the vehicle pertaining to a case where the alternative destination is suggested.

Next, a process of providing the reward pertaining to a case where the alternative destination is suggested will be described by using a flowchart in FIG. 3. The process in the flowchart in FIG. 3 is started when the autonomous driving control for traveling to the destination set in advance is started. The process in the flowchart in FIG. 3 is repeatedly performed for each predetermined period of time while the autonomous driving control for traveling to the destination set in advance is being performed. More specifically, in a case where the process reaches the end after a process of determining to maintain the autonomous driving control for traveling to the destination set in advance in S210, the process is started from the start after a predetermined time elapses. However, in a case where the process reaches the end after the autonomous driving control is stopped with a process of stopping the vehicle (S208) being performed, the process is started from the start when the autonomous driving control is started again.

As illustrated in FIG. 3, when the autonomous driving control is started, the vehicle position determination unit 16 determines whether the position of the vehicle V is within the area around the destination (S201). Here, the area around the destination is an area specified based on the destination set in advance. In a case where the position of the vehicle V is not within the area around the destination (S201: NO), the autonomous driving device 100 determines to maintain the autonomous driving control for traveling to the destination set in advance that is performed by the traveling controller 23 (S210). Therefore, the autonomous driving control for traveling to the destination set in advance that is performed by the traveling controller 23 is maintained.

In a case where the position of the vehicle V is within the area around the destination (S201: YES), the stop section estimation unit 18 estimates whether the autonomous driving stop section is present on the target route from the position of the vehicle V to the destination set in advance and estimates the position of the autonomous driving stop section (S202). In a case where the stop section estimation unit 18 estimates that the autonomous driving stop section is not present (S202: NO), the autonomous driving device 100 determines to maintain the autonomous driving control for traveling to the destination set in advance that is performed by the traveling controller 23 (S210). Therefore, the autonomous driving control for traveling to the destination set in advance that is performed by the traveling controller 23 is maintained.

In a case where the stop section estimation unit 18 estimates that the autonomous driving stop section is present (S202: YES), the alternative destination suggestion unit 19 suggests the alternative destination that is different from the destination set in advance to the occupant (S203). The intention confirmation unit 20 confirms whether a change of destination to the alternative destination from the destination set in advance has been accepted or not based on an operation on the input button or the like of the HMI 9 (S204).

In a case where the occupant does not accept the change of destination to the alternative destination (S204: NO), the autonomous driving device 100 determines to maintain the autonomous driving control for traveling to the destination set in advance that is performed by the traveling controller 23 (S210). Therefore, the autonomous driving control for traveling to the destination set in advance that is performed by the traveling controller 23 is maintained. Note that, the traveling controller 23 continues the autonomous driving control for traveling to the destination set in advance although the stop section estimation unit 18 has estimated that the autonomous driving stop section is present on the target route to the destination set in advance. In a case where the vehicle V arrives at the autonomous driving stop section and it becomes not possible to continue the autonomous driving control, the traveling controller 23 terminates the autonomous driving control. Therefore, the driving state of the vehicle V is switched from the autonomous driving state to the manual driving state. In a case where it is possible to continue the autonomous driving control although the vehicle V has arrived at the autonomous driving stop section, the traveling controller 23 continues the autonomous driving control.

In a case where the occupant accepts the change of destination to the alternative destination (S204: YES), the traveling plan generation unit 14 generates a traveling plan for traveling to the alternative destination (S205). The traveling controller 23 performs the autonomous driving control of the vehicle V based on the traveling plan for traveling to the alternative destination (S206). The traveling controller 23 determines whether the vehicle V has arrived at the alternative destination based on the position or the like of the vehicle V that is recognized by the vehicle position recognition unit 11 (S207). In a case where the vehicle V does not arrive at the alternative destination (S207: NO), the traveling controller 23 continues the autonomous driving control for traveling to the alternative destination (S206).

In a case where the vehicle V arrives at the alternative destination (S207: YES), the traveling controller 23 stops the vehicle V and terminates the autonomous driving control for traveling to the alternative destination (S208). Since the vehicle V is stopped, it becomes possible for the occupant to get off the vehicle. After the vehicle V is stopped, the reward provision unit 22 provides the reward for getting off the vehicle (S209).

Specific examples of a situation in which the alternative destination is suggested include a situation in which a place slightly distant from a station is suggested as the alternative destination in order to avoid congestion in a case where a congested place such as a station is the destination set in advance. In this case, the autonomous driving device 100 provides reward in a case where the occupant accepts travel to the alternative destination slightly distant from the station. For example, in a case where the vehicle V that performs autonomous driving is a taxi or a vehicle shared by a plurality of persons, a larger number of persons can use the vehicle (it is possible to improve turnover) when the vehicle performs autonomous driving toward the alternative destination while avoiding the congested place.

As with a case described above, after the occupant gets off the vehicle, the autonomous driving device 100 may make the vehicle V travel autonomously to a place set in advance.

The embodiment is configured as above, and in a case where the position of the vehicle V is within the area around the destination and the autonomous driving stop section is present between the current position of the vehicle V and the destination set in advance, the autonomous driving device 100 confirms whether the occupant of the vehicle has the intention to get off the vehicle. In a case where the occupant has the intention to get off the vehicle, the autonomous driving device 100 stops the vehicle V before the vehicle arrives at the autonomous driving stop section. Therefore, in a case where the autonomous driving stop section is present and the occupant has the intention to get off the vehicle, the driving state of the vehicle V is not switched from the autonomous driving state to the manual driving state. Accordingly, with the autonomous driving device 100, it is possible to further reduce inconvenience that is felt by the occupant when the driving state of the vehicle V is switched from the autonomous driving state to the manual driving state. The autonomous driving device 100 provides reward for getting off the vehicle in a case where the occupant has the intention to get off the vehicle. Therefore, with the autonomous driving device 100, it is possible to motivate the occupant to get off the vehicle by providing the reward. Since the occupant moves by foot after getting off the vehicle V, it is possible to promote the health of the occupant.

The area around the destination is an area in which a time taken for the vehicle V traveling under the autonomous driving control to arrive at the destination becomes equal to or shorter than a predetermined time. For example, there is a case where it takes a relatively long time to arrive at a destination since it is not possible to arrive at the destination without taking a detour even though the linear distance to the destination is short. Even in such a case, since the area around the destination is set based on a time taken to arrive at the destination, the autonomous driving device 100 can determine whether the position of the vehicle V is within the area around the destination based on the area around the destination that is appropriately set.

The autonomous driving device 100 estimates whether the autonomous driving stop section is present based on the traffic information on the route to the destination and estimates the position of the autonomous driving stop section based on the traffic information on the route to the destination. In this case, the autonomous driving device 100 can appropriately estimate whether the autonomous driving stop section is present and the position of the autonomous driving stop section based on the acquired traffic information.

The intention confirmation unit 20 confirms whether the occupant has the intention to get off the vehicle based on an operation on the input button or the like of the HMI 9 that is performed by the occupant. In this case, the occupant of the vehicle V can input an operation indicating the intention to get off the vehicle to the autonomous driving device 100 through the HMI 9.

In a case where the autonomous driving device 100 provides reward for getting off the vehicle, the autonomous driving device 100 determines whether the occupant is staying at a destination for a predetermined time or more based on the positional information of the portable terminal of the occupant and provides the reward when the occupant stays at the destination for the predetermined time or more. In this case, the autonomous driving device 100 can appropriately provide the reward based on whether the occupant is staying at the destination after getting off the vehicle.

Although the embodiment of the disclosure has been described above, the invention is not limited to the embodiment. For example, the stop section estimation unit 18 may estimate the position or the like of the autonomous driving stop section based on information other than the traffic information. For example, the stop section estimation unit 18 may estimate the autonomous driving stop section based on weather information, the presence or absence of construction, travel information of other autonomous driving vehicles, or the like. The autonomous driving device 100 is provided with the first communication unit 5 and the second communication unit 6. However, the two communication units may not be provided. The first communication unit 5 may have a function as the second communication unit 6 also.

What is claimed is:

1. An autonomous driving device for performing autonomous driving control that makes a vehicle travel autonomously, the autonomous driving device comprising:
   an electronic control unit (ECU) programmed to:
   acquire a route for a time when the vehicle travels to a destination set in advance under the autonomous driving control;
   determine whether a position of the vehicle is within an area around the destination including the destination;
   estimate whether an autonomous driving stop section having a possibility that the autonomous driving control is stopped is present on a route from the position of the vehicle to the destination and to estimate a position of the autonomous driving stop section in a case where the position of the vehicle is within the area around the destination;
   confirm whether an occupant of the vehicle has an intention to get off the vehicle in a case where the position of the vehicle is within the area around the destination and the autonomous driving stop section is estimated to be present between a current position of the vehicle and the destination;
   provide reward for getting off the vehicle in a case where the occupant has the intention to get off the vehicle; and
   perform the autonomous driving control and to stop the vehicle before the vehicle arrives at the autonomous driving stop section in a case where the occupant has the intention to get off the vehicle while the autonomous driving control is being performed.

2. The autonomous driving device according to claim 1, wherein the area around the destination is an area in which a time taken for the vehicle traveling under the autonomous driving control to arrive at the destination becomes equal to or shorter than a predetermined time.

3. The autonomous driving device according to claim 1, wherein the ECU is further programmed to acquire traffic information on the route to the destination,
   wherein the ECU estimates whether the autonomous driving stop section is present based on the acquired traffic information and estimates the position of the autonomous driving stop section based on the acquired traffic information.

4. The autonomous driving device according to claim 1, further comprising an operation unit configured to be operated by the occupant,
   wherein the intention confirmation unit gives notification for confirming the intention to get off the vehicle and confirms whether the occupant has the intention to get off the vehicle based on an operation on the operation unit that is performed by the occupant.

5. The autonomous driving device according to claim 1, wherein the ECU is further programmed to acquire positional information of a portable terminal that is carried by the occupant,
   wherein the ECU determines whether the occupant is staying at the destination for a predetermined time or more after getting off the vehicle based on the acquired positional information of the portable terminal and provides the reward when the occupant stays at the destination for the predetermined time or more in a case where the reward is provided for getting off the vehicle.

6. An autonomous driving method for performing autonomous driving control that makes a vehicle travel autonomously, the autonomous driving method comprising:
   acquiring a route, using an electronic control unit (ECU) having at least one processor, for a time when the vehicle travels to a destination set in advance under the autonomous driving control;
   determining, using the ECU, whether a position of the vehicle is within an area around the destination including the destination;
   estimating, using the ECU, whether an autonomous driving stop section having a possibility that the autonomous driving control is stopped is present on a route from the position of the vehicle to the destination and estimating a position of the autonomous driving stop section in a case where the position of the vehicle is within the area around the destination;
   confirming, using the ECU, whether an occupant of the vehicle has an intention to get off the vehicle in a case where determination is made that the position of the vehicle is within the area around the destination and estimation is made that the autonomous driving stop section is present between a current position of the vehicle and the destination;

providing reward, using the ECU, for getting off the vehicle in a case where confirmation is made that the occupant has the intention to get off the vehicle; and stopping the vehicle, using the ECU, before the vehicle arrives at the autonomous driving stop section in a case where confirmation is made that the occupant has the intention to get off the vehicle while the autonomous driving control is being performed.

7. The autonomous driving method according to claim 6, wherein the area around the destination is an area in which a time taken for the vehicle traveling under the autonomous driving control to arrive at the destination becomes equal to or shorter than a predetermined time.

8. The autonomous driving method according to claim 6, further comprising acquiring, using the ECU, traffic information on the route to the destination that is acquired in the acquiring of the route, wherein whether the autonomous driving stop section is present is estimated based on the acquired traffic information and the position of the autonomous driving stop section is estimated based on the acquired traffic information.

9. The autonomous driving method according to claim 6, wherein:

the vehicle includes an operation unit configured to be operated by the occupant; and notification for confirming the intention to get off the vehicle is performed and whether the occupant has the intention to get off the vehicle is confirmed based on an operation on the operation unit that is performed by the occupant.

10. The autonomous driving method according to claim 6, further comprising acquiring, using the ECU, positional information of a portable terminal that is carried by the occupant, wherein whether the occupant is staying at the destination for a predetermined time or more after getting off the vehicle is determined based on the acquired positional information of the portable terminal and the reward is provided when the occupant stays at the destination for the predetermined time or more in a case where the reward for getting off the vehicle is provided.

* * * * *